US010598962B2

(12) United States Patent
Zweerts et al.

(10) Patent No.: US 10,598,962 B2
(45) Date of Patent: Mar. 24, 2020

(54) METHOD FOR MANUFACTURING A SPECTACLE FRAME ADAPTED TO A SPECTACLE WEARER

(71) Applicant: MAYDO B.V., Bussum (NL)

(72) Inventors: Jan Berend Benjamin Zweerts, Naarden (NL); Pieter Adriaan Jonckheer, Bussum (NL)

(73) Assignee: MAYDO B.V., Bussum (NL)

( * ) Notice: Subject to any disclaimer, the term of this patent is extended or adjusted under 35 U.S.C. 154(b) by 149 days.

(21) Appl. No.: 15/578,217

(22) PCT Filed: May 30, 2016

(86) PCT No.: PCT/NL2016/050388
§ 371 (c)(1),
(2) Date: Nov. 29, 2017

(87) PCT Pub. No.: WO2016/195488
PCT Pub. Date: Dec. 8, 2016

(65) Prior Publication Data
US 2018/0149886 A1 May 31, 2018

(30) Foreign Application Priority Data

May 29, 2015 (NL) .................................. 2014891

(51) Int. Cl.
G02C 13/00 (2006.01)
B33Y 50/02 (2015.01)
(Continued)

(52) U.S. Cl.
CPC .......... *G02C 13/003* (2013.01); *B29C 64/393* (2017.08); *B29D 12/02* (2013.01);
(Continued)

(58) Field of Classification Search
None
See application file for complete search history.

(56) References Cited

U.S. PATENT DOCUMENTS

2015/0055085 A1* 2/2015 Fonte ...................... G06F 16/22
351/178
2015/0127132 A1 5/2015 Nyong

FOREIGN PATENT DOCUMENTS

DE 102009004380 7/2010
EP 2161611 3/2010
WO WO-2014195471 12/2014

* cited by examiner

Primary Examiner — Ricky L Mack
Assistant Examiner — Gary W O'Neill
(74) Attorney, Agent, or Firm — Marcus C. Dawes

(57) ABSTRACT

The present invention relates to a method for manufacturing a spectacle frame adapted to a spectacle wearer, particularly by means of 3D printing or other additive manufacturing techniques. The present invention provides for this purpose a method comprising the steps of providing a virtual 3D model of a spectacle frame; providing a virtual 3D model of the head of the spectacle wearer which comprises at least a part of the head of the spectacle wearer which is in contact with the spectacle frame when the spectacle frame is being worn; positioning the 3D model of the spectacle frame relative to the 3D model of the head in a virtual environment so that the 3D model of the head intersects the 3D model of the spectacle frame where said part of the head of the spectacle wearer is in contact with the spectacle frame when the spectacle frame is being worn; cutting a portion out of the 3D model of the spectacle frame along the intersecting plane of the 3D model of the spectacle frame and the 3D model of the head; and manufacturing at least a part of the spectacle frame on the basis of the part of the 3D model of the spectacle frame from which the portion has been cut.

24 Claims, 10 Drawing Sheets

(51) Int. Cl.
  *B29D 12/02* (2006.01)
  *B29C 64/393* (2017.01)
  *G06F 17/50* (2006.01)
  B33Y 80/00 (2015.01)
  B29C 64/386 (2017.01)
  B29L 12/00 (2006.01)
(52) U.S. Cl.
  CPC .............. *B33Y 50/02* (2014.12); *G06F 17/50* (2013.01); *B29C 64/386* (2017.08); *B29L 2012/005* (2013.01); *B33Y 80/00* (2014.12); *G06F 2217/06* (2013.01); *G06F 2217/12* (2013.01)

METHOD FOR MANUFACTURING A SPECTACLE FRAME ADAPTED TO A SPECTACLE WEARER

The present invention relates to a method for manufacturing a spectacle frame adapted to a spectacle wearer, particularly by means of 3D printing or other additive manufacturing techniques.

New manufacturing techniques, such as 3D printing or other additive manufacturing techniques, make it possible to manufacture a single product at relatively low cost. These techniques are thereby suitable for manufacturing a product according to the specific wishes of a person. A 3D model of the product can be made in a virtual environment on the basis of the wishes of the person in question, after which the product is manufactured on the basis of the virtual 3D model by applying 3D printing or other additive manufacturing technique.

3D printing or other additive manufacturing techniques are also applied for the manufacture of spectacle frames in order to manufacture frames with a shape and size which fit the wishes and features of a person. In a known application a 3D model of a spectacle frame is adapted to the person who will wear the frame, referred to below as the spectacle wearer, in a virtual environment on the basis of biometric features of the head of the spectacle wearer in order to thus manufacture a frame having a higher wearer comfort. It is perceived as a problem here that the original design of the spectacle frame as designed by the designer changes when the frame is adapted on the basis of biometric features of the face of the wearer. This may result in the appearance of the manufactured, adapted model differing from the appearance of the unadapted frame to such an extent that the spectacle wearer no longer likes the appearance of the manufactured, adapted model. This latter is a particular risk for opticians wishing to offer a thus manufactured spectacle frame. This is because there is a chance that the spectacle wearer will not be satisfied with the shape of the spectacle frame during or after adaptation of the frame, or even after manufacture of the frame. An additional problem is that designers of spectacle frames do not like the shape of the frames designed by them to be adapted to such an extent that the shape visibly changes. It has also been found here that it is difficult for designers to design a frame which retains the same shape as the original design after being adapted to a specific spectacle wearer by means of deformation of parts of the frame.

The present invention has for its object, among others, to reduce at least one of the problems outlined above.

The present invention provides for this purpose a method comprising the favourable steps of:
- providing a virtual 3D model of a spectacle frame;
- providing a virtual 3D model of the head of the spectacle wearer which comprises at least a part of the head of the spectacle wearer which is in contact with the spectacle frame when the spectacle frame is being worn;
- positioning the 3D model of the spectacle frame relative to the 3D model of the head in a virtual environment so that the 3D model of the head intersects the 3D model of the spectacle frame where said part of the head of the spectacle wearer is in contact with the spectacle frame when the spectacle frame is being worn;
- cutting a portion out of the 3D model of the spectacle frame along the intersecting plane of the 3D model of the spectacle frame and the 3D model of the head;
- manufacturing at least a part of the spectacle frame on the basis of the part of the 3D model of the spectacle frame from which the portion has been cut.

In the method according to the invention a part of a spectacle frame with which the head of the spectacle wearer is in contact when the frame is being worn is adapted to the surface of the head at the location where this part of the frame is in contact with the head. The adapted part of the frame is thus shaped to the surface of the head of the spectacle wearer so that the frame is particularly comfortable to wear at the contact location in question, particularly as a result of the distribution of the pressure points over a greater contact area. The spectacle frame is thereby adapted to the spectacle wearer and feels to the wearer to be adapted to him/her without adapting the further shape of the frame, i.e. the parts which are not in contact with the head, such that the shape of the spectacle frame is lost. Cutting a portion out of the unadapted 3D model of the frame prevents forms and lines in the shape of the frame and the proportions thereof, as chosen by the designer, being deformed during adaptation of the frame. This prevents the shape of the unadapted spectacle frame being adapted such that the shape of the manufactured, adapted frame feels different to the wearer than the unadapted frame in respect of shape. Because lines and forms and the proportions thereof are not deformed in the method according to the invention, the original shape of the spectacle frame as designed by the designer is preserved. A 3D design for a spectacle frame can be made suitable for the method according to the invention in relatively simple manner here by adding matter in a 3D model of the original frame to the parts of the frame which were already designed in the original design to be in contact with the head of the spectacle wearer. This added matter is cut away again at least partially during performing of the method. A portion of the added matter which may not have been cut away is found not to have any relevant influence on the original shape of the frame.

The preservation of the original shape of the spectacle frame as designed by the designer during adaptation of a frame according to the method according to the invention has been found to result in a desired outcome for the designer, the optician and the spectacle wearer.

The 3D model of the spectacle frame favourably comprises the frame front, and the 3D model of the head favourably comprises at least the nose of the spectacle wearer, wherein:
- the frame front of the 3D model of the spectacle frame is positioned relative to the 3D model of the head in the virtual environment such that the nose of the 3D model of the head intersects the frame front of the 3D model of the spectacle frame where the frame front of the spectacle frame is worn on the nose of the spectacle wearer in a desired position of wear;
- a portion is cut out of the frame front of the 3D model of the spectacle frame along the intersecting plane of the frame front of the 3D model of the spectacle frame and the nose of the 3D model of the head; and
- the frame front is manufactured on the basis of the frame front of the 3D model of the spectacle frame from which the portion has been cut.

The frame front of a spectacle frame is the part of the frame which carries the lenses. The frame front rests on the nose of the spectacle wearer when the frame is being worn. By positioning the frame front of the 3D model of the spectacle frame relative to the 3D model of the head of the wearer as according to this embodiment of the method according to the invention so that the frame front of the 3D model of the frame intersects the nose of the 3D model of the head where the frame front of the frame is worn on the nose of the wearer in a desired position of wear, and then cutting a portion out of the frame front of the 3D model of the frame along the intersecting plane of the frame front of the 3D model of the frame and the nose of the 3D model of the head, the part of the frame front of the spectacle frame which is in contact with the nose of the spectacle wearer is shaped to the surface of the nose, so that the frame front can be worn particularly comfortably on the nose without unpleasant pressure points.

The position of the frame front relative to the nose is determined here because the surface of the nose has been cut out of the frame front of the spectacle frame in 3D, so that the frame front feels most comfortable to the spectacle wearer when the wearer has placed the frame front in the position on the nose which was chosen as desired position of wear during adaptation of the spectacle frame. The wearer is thus stimulated to wear the frame front in the chosen position. This is particularly favourable when the spectacle lenses carried by the frame front are measured on the basis of the position of the frame front on the nose of the wearer chosen during adaptation of the spectacle frame. The spectacle lenses are then in the optimal position thereof relative to the eyes when the spectacle wearer wears the frame front in the chosen position of wear relative to the nose. By stimulating the wearer to wear the frame front in the chosen position of wear thereof, the action of the spectacle lenses is optimal, which contributes to the comfort experienced by the user when the frame is being worn.

Although the spectacle frame will feel to the spectacle wearer to be adapted to him/her when it is being worn due to the surface of the nose being cut out of the frame front of the frame, the forms and lines of the frame front which are particularly defining for the shape of the frame as a whole are not deformed owing to the cutting out of a portion. By cutting out a portion from the frame front of the 3D model of the frame, the frame front is thus adapted to the wearer without deforming the forms and lines of the shape of the frame front and the proportions thereof.

Providing the 3D model of the spectacle frame favourably comprises of choosing a 3D model from a collection of 3D models of spectacle frames with different widths on the basis of the width of the head of the spectacle wearer.

The present invention particularly provides a method for manufacturing a spectacle frame adapted to a spectacle wearer, wherein the spectacle frame comprises a frame front and frame temples, and the method comprises the steps of:
  providing a collection of virtual 3D models of the spectacle frame to be manufactured with different widths of the spectacle frame, these 3D models comprising at least the frame front of the spectacle frame;
  choosing a virtual 3D model from the collection of virtual 3D models on the basis of the width of the head of the spectacle wearer in order to adapt the width of the spectacle frame to be manufactured to the width of the head of the spectacle wearer;
  providing a virtual 3D model of the head of the spectacle wearer, which comprises at least a part of the head of the spectacle wearer which is in contact with the frame front when the spectacle frame is being worn;
  positioning the frame front of the chosen 3D model of the spectacle frame in a desired position of wear relative to the 3D model of the head in a virtual environment so that the 3D model of the head intersects the rear side of the frame front of the chosen 3D model of the spectacle frame where the frame front of the spectacle frame is worn on the nose of the spectacle wearer in the desired position of wear;
  cutting a portion out of the rear side of the frame front of the chosen 3D model of the spectacle frame along the intersecting plane of the frame front of the chosen 3D model of the spectacle frame and the 3D model of the head in order to adapt the frame front of the spectacle frame to be manufactured to the spectacle wearer;
  manufacturing the frame front of the spectacle frame on the basis of the chosen 3D model of the spectacle frame, wherein the frame front has an unadapted front side with the original forms and sizes of the chosen 3D model and the frame front has a rear side adapted by means of the cut-out portion.

This method according to the invention relates to a combination of the above described favourable steps and the advantages associated therewith, as described above and as described in the figure description.

It is noted that the 3D model of the head of the spectacle wearer relative to which the 3D model of the spectacle frame is positioned in the method according to the invention need not comprise the whole head of the wearer, but comprises at least a part of the head of the wearer which is in contact with the spectacle frame when the frame is being worn, such as (a part of) the nose of the wearer. Incorporating additional parts of the head of the spectacle wearer into the 3D model of the head can however help in positioning of the 3D model of the frame relative to the 3D model of the head, and is thereby recommended.

In respect of the position of a frame front of a spectacle frame relative to the head of the spectacle wearer it is possible to distinguish between the location on the nose of the wearer where the frame front is in contact with the nose, and the tilting of the frame front in the so-called sagittal plane of the head of the wearer. The sagittal plane is an anatomical plane which divides the body, including the head, into a left and right half.

In a favourable embodiment of the method according to the invention, wherein the frame front of the 3D model of the spectacle frame is positioned relative to the 3D model of the head, this positioning comprises of positioning the frame front of the 3D model of the frame at a location on the nose of the 3D model of the head which corresponds to the location on the nose where the frame front is in the desired position of wear of the frame front.

When a spectacle frame is being worn, the frame front rests at a location on the nose, i.e. at a location along the nasal bone. By positioning the frame front of the 3D model of the spectacle frame at a location on the nose of the 3D model of the head, wherein the frame front of the 3D model of the frame intersects the nose of the 3D model of the head and a portion is cut out of the frame front of the 3D model of the frame along the intersecting plane, there results a frame front after manufacture which is particularly comfortable to wear when the frame front is positioned at the location along the nasal bone which corresponds to the location on the nose of the spectacle wearer chosen during positioning of the frame front of the 3D model of the frame relative to the nose of the 3D model of the head.

In a favourable embodiment thereof, the method comprises of marking in the virtual 3D model of the head of the location on the nose where the frame front is situated in the desired position of wear of the frame front, before said positioning of the frame front of the 3D model of the spectacle frame. The positioning of the frame front of the 3D model of the spectacle frame relative to the 3D model of the head in the virtual environment is simplified by marking the location on the nose where the frame front is situated in the desired position of wear of the front before positioning of the frame front of the 3D model of the spectacle frame relative to the 3D model of the head. Marking the location on the nose where the frame front is situated in the desired position of wear of the frame front thus enables a favourable embodiment of the method, wherein the positioning of the frame front of the 3D model of the spectacle frame at a location on the nose of the 3D model of the head is performed depending on the marked location in the 3D model of the head.

In a favourable embodiment the marking on the 3D model of the head of the location on the nose where the frame front is situated in the desired position of wear of the frame front comprises of marking on the nose of the spectacle wearer of a location which represents the location where the frame front is situated in the desired position of wear, before the 3D model of the wearer is provided, and the 3D model of the wearer is provided on the basis of the nose of the wearer with the location marked thereon. The location on the nose where the frame front is situated in the desired position of wear of the spectacle frame can thus be marked on the actual nose of the spectacle wearer. According to an alternative embodiment, the marking is arranged in the 3D model of the wearer in the virtual environment.

In a further favourable embodiment of the method according to the invention, wherein the frame front of the 3D model of the spectacle frame is positioned relative to the 3D model of the head, this positioning comprises of tilting the frame front of the 3D model of the frame relative to the nose of the 3D model of the head in the sagittal plane of the head. The so-called pantoscopic angle of the frame front can be set by tilting the frame front of the 3D model of the spectacle frame relative to the nose of the 3D model of the head in the sagittal plane of the head. The setting of the pantoscopic angle of the frame front is important for a correct positioning of the lenses relative to the eyes when the spectacle frame is being worn. The pantoscopic angle can be positive or negative. A negative pantoscopic angle is also referred to as a retroscopic angle.

It is noted that in order to cut the nose of the 3D model of the head out of the frame front of the 3D model of the spectacle frame, the 3D model of the head comprises at least the nose of the spectacle wearer. The position of the eyes in the head of the wearer is however taken into consideration when choosing the desired position of the frame front of the spectacle frame relative to the head. This latter particularly because the frame front carries the lenses which are used by the eyes when the spectacle frame is being worn to be able to see better. The 3D model of the head therefore comprises in a preferred embodiment at least a representation of the eyes of the spectacle wearer. The positioning of the frame front of the 3D model of the spectacle wearer relative to the 3D model of the head is preferably performed here depending on said representation of the eyes of the wearer.

As further described below, in other favourable embodiments the 3D model of the head also comprises, in addition to the nose, other parts of the head of the spectacle wearer on which to base the positioning of the frame front relative to the 3D model of the head of the wearer.

In order to ensure that the frame front is only in contact with the nose of the spectacle wearer when it is being worn in the desired position of wear, and not with other parts of the face of the wearer, in a further favourable embodiment of the method according to the invention the virtual 3D model of the head comprises at least the face of the spectacle wearer, and during the positioning of the frame front of the 3D model of the spectacle frame relative to the 3D model of the head, the frame front of the 3D model of the frame is positioned relative to the 3D model of the head such that the 3D model of the head only intersects the frame front of the 3D model of the frame where the frame front is worn on the nose in the desired position of wear thereof.

In order to ensure that the eyelashes of the spectacle wearer lie clear of the lenses carried by the frame front when the frame is being worn in the desired position of wear, in a further favourable embodiment of the method according to the invention the virtual 3D model of the head comprises at least the eyelashes of the spectacle wearer, the 3D model of the spectacle frame comprises at least a representation of the location of the lenses in the frame front, and during positioning of the frame front of the 3D model of the spectacle frame relative to the 3D model of the head, the frame front of the 3D model of the frame is positioned relative to the 3D model of the head on the basis of the representation of the lenses such that the eyelashes of the 3D model of the head lie clear of the lenses to be positioned in the frame front.

In a preferred embodiment of the method according to the invention the 3D model of the spectacle frame comprises the frame temples of the spectacle frame to be adapted, wherein the position of the frame temples of the 3D model of the spectacle frame is associated with the position of the frame front of the 3D model of the spectacle frame.

The frame temples of a spectacle frame generally rest on the ears of the spectacle wearer, close to the base where the ears join onto the head, when the frame is being worn. Each frame temple is connected to the frame front of the spectacle frame, generally by means of a hinge. This connection determines the positioning of the frame temples relative to the frame front. When the spectacle frame is being worn, the forms and sizes of the frame temples, the positioning of the frame temples relative to the frame front determined by the connection between the frame temples and the frame front, the location on the nose of the wearer where the frame is in contact with the nose, and the location where the frame temples rest on the head of the wearer determine the above described tilting of the frame front in the sagittal plane and thereby the positioning of the frame front relative to the head of the spectacle wearer. By incorporating the frame temples and the relative position of the frame temples and the frame front which is imposed by the connection to the frame front into the 3D model of the spectacle frame as according to this favourable embodiment of the method according to the invention, and incorporating into the 3D model of the head a representation of the location where the spectacle frame is in contact with the head of the wearer when it is being worn, the frame temples can be taken into consideration during positioning of the frame front of the 3D model of the frame relative to the nose of the 3D model of the head. In addition to manufacturing of the frame front of the spectacle frame, the method preferably also comprises here of manufacturing the frame temples on the basis of the frame temples of the 3D model of the frame.

The latter stated favourable measure that the method according to the invention also comprises, in addition to manufacturing of the frame front of the spectacle frame, of manufacturing the frame temples on the basis of the frame temples of the 3D model of the frame particularly enables a further preferred embodiment of the method according to the invention. In this further preferred embodiment the method according to the invention also comprises of adapting the frame temples of the 3D model of the spectacle frame in the virtual environment, wherein the frame temples are manufactured on the basis of the adapted frame temples of the 3D model of the frame. This preferred embodiment particularly enables an embodiment wherein the frame temples of the 3D model of the spectacle frame are adapted to the position of the frame front of the 3D model of the frame relative to the 3D model of the head during or after the positioning of the frame front of the 3D model of the frame relative to the 3D model of the head. The positioning of the frame front of the 3D model of the spectacle frame relative to the 3D model of the head thus becomes less dependent on the frame temples of the frame, so that during positioning of the frame front of the 3D model of the spectacle frame relative to the 3D model of the head there is for instance more freedom in the positioning of the frame front depending on the eyes of the spectacle wearer. In order to simplify the adaptation of the frame temples of the 3D model of the spectacle frame during or after the positioning of the frame front of the 3D model of the frame relative to the 3D model of the head, the position of the frame front of the 3D model of the frame relative to the 3D model of the head is in a favourable embodiment maintained during adaptation of the frame temples of the 3D model of the spectacle frame.

During adaptation of the frame temples of the 3D model of the spectacle frame to the position of the frame front of the 3D model of the frame relative to the 3D model of the head during or after the positioning of the frame front of the 3D model of the frame relative to the 3D model of the head, the frame temples are adapted depending on the position of the frame front of the 3D model of the spectacle frame relative to the 3D model of the head. In the method according to the invention, wherein the frame temples of the 3D model of the spectacle frame are adapted, they are in addition or alternatively adapted depending on at least one of:
  the constraints, defined between the frame front of the 3D model of the spectacle frame and the frame temples of the 3D model of the spectacle frame, in respect of the position of the frame front relative to the frame temples;
  the curvature of the 3D model of the head along which the frame temples of the 3D model of the spectacle frame run; and
  the location in the 3D model of the head which represents the location on the ears of the spectacle wearer where the frame temples rest on the ears when the frame is being worn.

According to the invention, the adaptation of the frame temples of the 3D model of the spectacle frame can relate to different features of the frame temples.

In an embodiment the adaptation of the frame temples of the 3D model of the spectacle frame comprises of adapting the length of the frame temples.

In an additional or alternative embodiment the adaptation of the frame temples of the 3D model of the spectacle frame comprises of adapting the curvature of the frame temples of the 3D model of the spectacle frame in an anatomical transverse plane of the head.

In an additional or alternative embodiment the adaptation of the frame temples of the 3D model of the spectacle frame comprises of adapting the orientation of the frame temples of the 3D model of the spectacle frame relative to the frame front of the 3D model of the spectacle frame.

The above stated adaptations do not per se have any relevant influence on the shape of the spectacle frame visible when the frame is being worn, however, particularly in the adaptation of the orientation of the frame temples of the 3D model of the spectacle frame relative to the frame front of the 3D model of the frame it is possible that mutually opposite parts of the frame front and the relevant frame temple of the 3D model of the frame have a noticeably differing orientation, which disrupts the shape of the spectacle frame. In order to avoid this, mutually opposite parts of the frame front and the relevant frame temple of the 3D model of the spectacle frame are in a preferred embodiment adapted to each other, this for each frame temple, during or after adaptation of the frame temples of the 3D model of the spectacle frame, by adapting at least one of the two parts.

Although a portion is in a preferred embodiment of the method according to the invention cut out of the frame front of the 3D model of the spectacle frame in order to manufacture a frame front which is adapted to the surface of the nose of the spectacle wearer with which the frame front is in contact when the frame is being worn, it is in addition or alternatively possible to cut a portion out of the frame temples of the 3D model of the frame in order to manufacture frame temples which are adapted to a surface of the head of the wearer with which the frame temples are in contact when the frame is being worn.

The present invention thus also relates to an embodiment of the method according to the invention wherein:
  the 3D model of the spectacle frame comprises the frame temples and the 3D model of the head comprises at least the part of the head of the spectacle wearer with which the frame temples are in contact in a desired position of wear;
  the frame temples of the 3D model of the spectacle frame are positioned relative to the 3D model of the head in the virtual environment so that the 3D model of the head intersects the frame temples of the 3D model of the spectacle frame where the frame temples of the spectacle frame are in contact with the head of the spectacle wearer in the desired position of wear;
  a portion is cut out of the frame temples of the 3D model of the spectacle frame along the intersecting plane of the frame temples of the 3D model of the spectacle frame and the 3D model of the head; and
  the frame temples are manufactured on the basis of the frame temples of the 3D model of the spectacle frame from which the portion has been cut.

The frame temples are thus adapted to the surface of the head with which the frame temples are in contact when the spectacle frame is being worn. The 3D model of the head preferably comprises here at least the part of the head close to the base where the ears join onto the head. The frame temples, particularly the free ends thereof, are thus adapted to the surface of the head close to the base where the ears join onto the head. It is once again the case that due to such an adaptation the spectacle frame feels to the spectacle wearer to be adapted to him/her.

Deformation of forms and lines of the frame temples and the proportions thereof is avoided here by the cut-out portion.

In the method according to the invention the manufacturing on the basis of a 3D model preferably comprises of manufacturing by means of an additive manufacturing technique, preferably a 3D printing technique.

Providing the 3D model of the head preferably comprises of scanning at least a part of the head of the spectacle wearer by means of a 3D scanning process, particularly making use of a so-called 3D scanner, or generating the 3D model on the basis of a series of 2D photos of at least a part of the head of the wearer. The 3D model of the head can be the 3D model resulting directly from the 3D scanning process or the 3D model resulting directly from the generation of a 3D model on the basis of 2D photos, but can also be a 3D model derived from the resulting 3D model.

In the method according to the invention a virtual environment is particularly a computer-generated virtual environment, such as a so-called 3D modeling space in a 3D CAD (Computer-Aided Design) computer program. In a preferred embodiment of the method according to the invention the virtual environment in which the 3D model of the spectacle frame is positioned relative to the 3D model of the head is a visual virtual environment. A visual environment is particularly suitable in positioning of the 3D models relative to each other, particularly if the positioning is done by a person such as the optician. In a favourable embodiment thereof, the locations where the 3D model of the spectacle frame and the 3D model of the head intersect each other are visually marked in the virtual environment during the positioning of the 3D model of the frame relative to the 3D model of the head in the virtual environment. The positioning of the 3D model of the spectacle frame relative to the 3D model of the head so as to have these 3D models intersect each other is thus simplified. What is alternatively provided for is that the 3D models are positioned relative to each other on the basis of mathematical models and mathematical calculations, without the 3D models being made visual in the virtual environment.

In a favourable embodiment of the method according to the invention the positioning of the frame front of the chosen 3D model of the spectacle frame in a desired position of wear relative to the 3D model of the head is performed in a first virtual environment; data relating to the desired position of wear are transferred to a second virtual environment after the positioning; and cutting a portion out of the rear side of the frame front of the chosen 3D model of the spectacle frame is performed in the second virtual environment on the basis of the transferred data relating to the desired position of wear. The first virtual environment is preferably provided on a computer system, such as a desktop computer or tablet computer, with an optician, so that the optician can position the frame front of the chosen 3D model of the spectacle frame in the desired position of wear relative to the 3D model of the head of the spectacle wearer in consultation with the wearer. Data relating to the desired position of wear are then transferred after the positioning to a second virtual environment with the manufacturer or an intermediary, wherein the portion is cut out of the rear side of the frame front of the 3D model of the spectacle frame on the basis of the data relating to the desired position of wear. This second virtual environment is then provided on a computer system with the manufacturer or intermediary. Other adaptations of the chosen 3D model are in this embodiment also made in the second virtual environment. In the second virtual environment the 3D model of the spectacle frame to be adapted is of course first positioned in the desired position of wear relative to the 3D model of the head before the 3D model of the frame is adapted. This positioning is performed on the basis of the data relating to the desired position of wear which are transferred to the second virtual environment. If necessary, corrections of the desired position of wear are implemented before a portion is cut out and before other adaptations are made. If the chosen 3D model is adapted by an intermediary, the adapted 3D model is subsequently passed on to the manufacturer. The frame front and, where applicable, the frame temples, are then manufactured by the manufacturer on the basis of the adapted 3D model.

It is possible that two different versions of the 3D model of the spectacle frame to be adapted are used in the first virtual environment and in the second virtual environment: i.e. a version optimized for positioning of the 3D model of the spectacle frame relative to the 3D model of the head in the first virtual environment and a version optimized for cutting a portion from and manufacturing the 3D model of the frame in the second virtual environment. In the first virtual environment the 3D model of the spectacle frame and the 3D model of the head are favourably shown in a so-called 3D viewer, in which the 3D model of the frame and the 3D model of the head can be displaced relative to each other in order to position the frame front and, where applicable, the frame temples of the 3D model of the frame relative to the 3D model of the head in the desired position of wear. In the second virtual environment the 3D model of the spectacle frame and the 3D model of the head are favourably shown in a 3D modeling space in a 3D CAD (Computer-Aided Design) computer program, in which the 3D model of the frame is adapted, this including the cutting out of the portion, on the basis of the 3D model of the head and the data relating to the desired position of wear.

The 3D model of the head of the spectacle wearer is preferably transferred from the first virtual environment to the second virtual environment together with the data relating to the desired position of wear. If the 3D model of the head of the spectacle wearer is transferred from the first virtual environment to the second virtual environment together with the data relating to the desired position of wear, the data relating to the desired position of wear favourably comprise coordinates of the 3D model of the spectacle frame relative to the 3D model of the head or coordinates of the 3D model of the frame and coordinates of the 3D model of the head relative to a reference coordinate system. On the basis of these data the 3D model of the spectacle frame to be adapted can be positioned in the desired position of wear, as determined in the first virtual environment, relative to the 3D model of the head in the second virtual environment.

The present invention will be further elucidated hereinbelow on the basis of exemplary embodiments which are shown schematically in the accompanying figures. These are non-limitative exemplary embodiments. In the figures.

Figure 1:
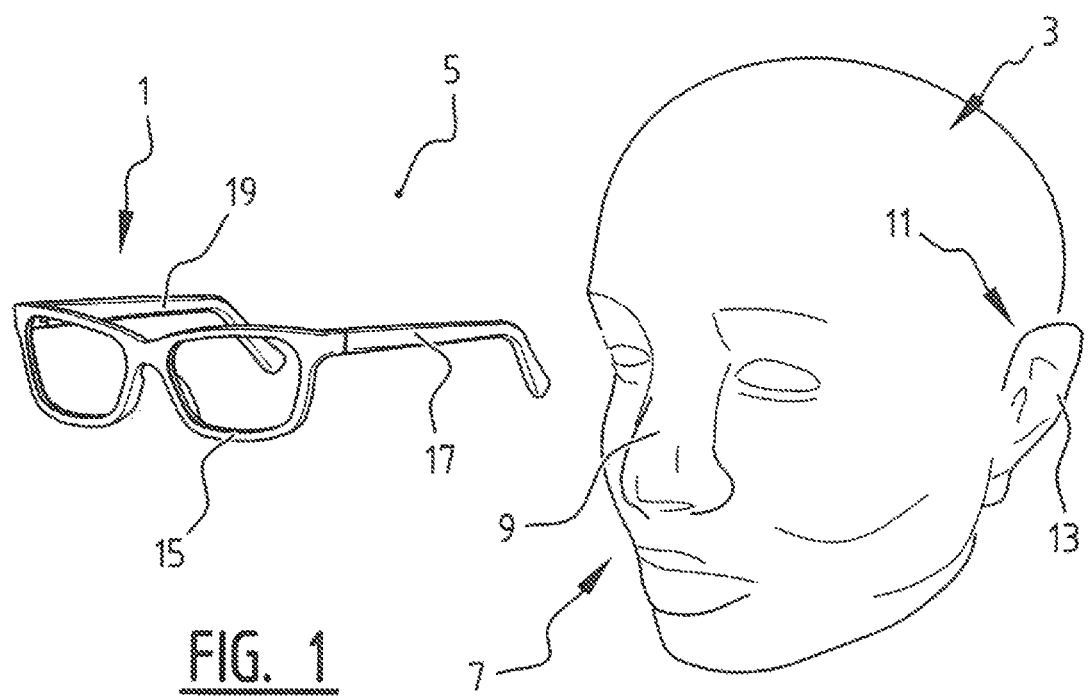
FIGS. 1 and 2 show a virtual environment with therein a 3D model of a spectacle frame to be adapted and a 3D model of the head of a spectacle wearer in perspective view.

FIG. 1 shows a 3D model of a spectacle frame 1 to be adapted and a 3D model of the head 3 of a spectacle wearer to which the 3D model of frame 1 has to be adapted in virtual environment 5 generated by a computer system.

The 3D model of head 3 of the spectacle wearer is obtained by means of a 3D scanning process. The 3D model of head 3 comprises the face 7 of the wearer, this including the nose 9 and the parts 11 of the head at the base of the ears 13 of the wearer with which the spectacle frame will be in contact when it is being worn.

The 3D model of spectacle frame 1 comprises frame front 15 and frame temples 17, 19, wherein the position of frame front 15 is associated with the position of frame temples 17, 19.

Figure 2:
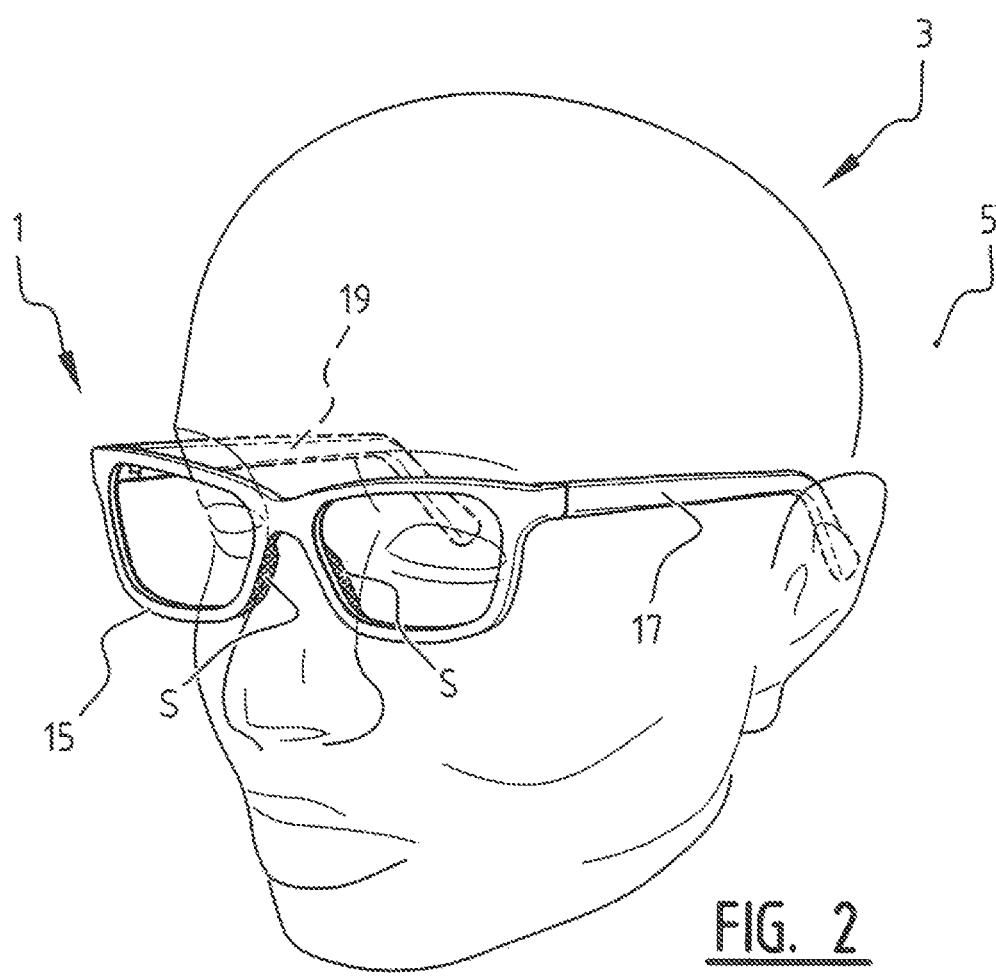

FIG. 2 shows that frame front 15 of the 3D model of spectacle frame 1 is positioned relative to the 3D model of head 3 in virtual environment 5 so that nose 9 of the 3D model of head 3 intersects frame front 15 of the 3D model of frame 1 where frame front 15 of frame 1 is worn on the nose 9 of the spectacle wearer in a desired position of wear. As shown, the locations where frame front 15 of the 3D model of frame 1 and nose 9 of the 3D model of head 3 intersect each other are visually marked in virtual environment 5 by means of hatching S.

Figure 3A:
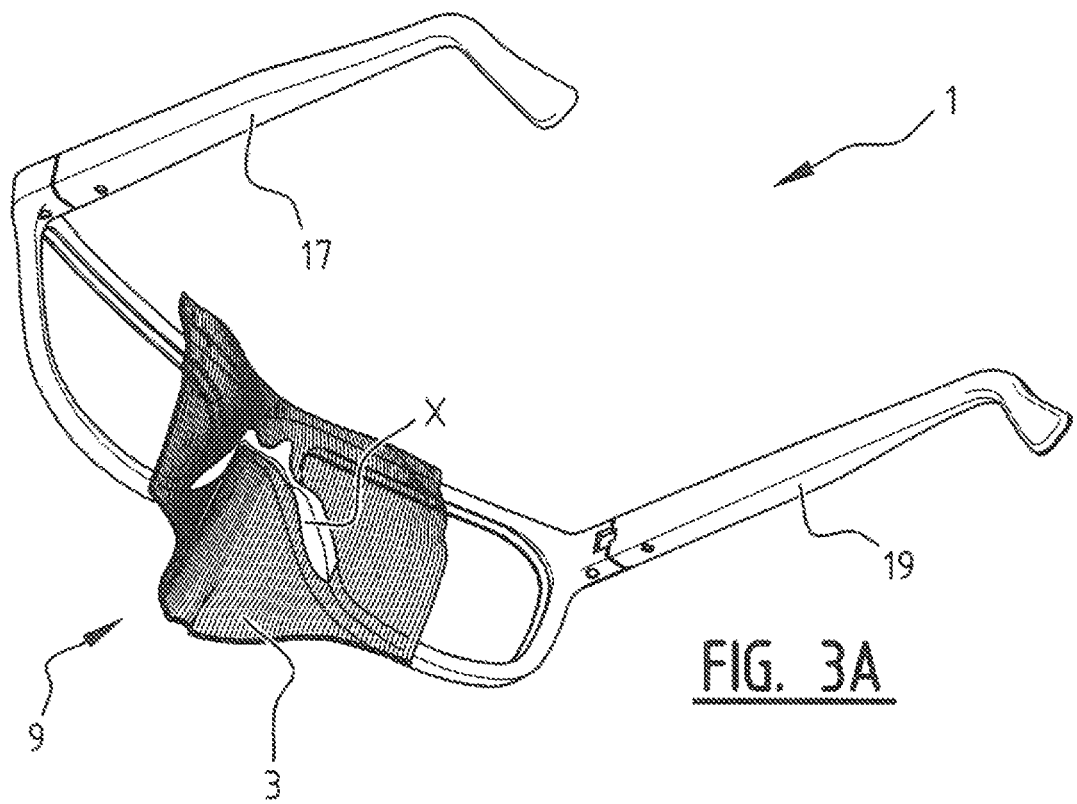
FIG. 3A shows a perspective view of the 3D model of a spectacle frame to be adapted and a part of the 3D model of the head of a spectacle wearer of FIG. 2.
Figure 3B:
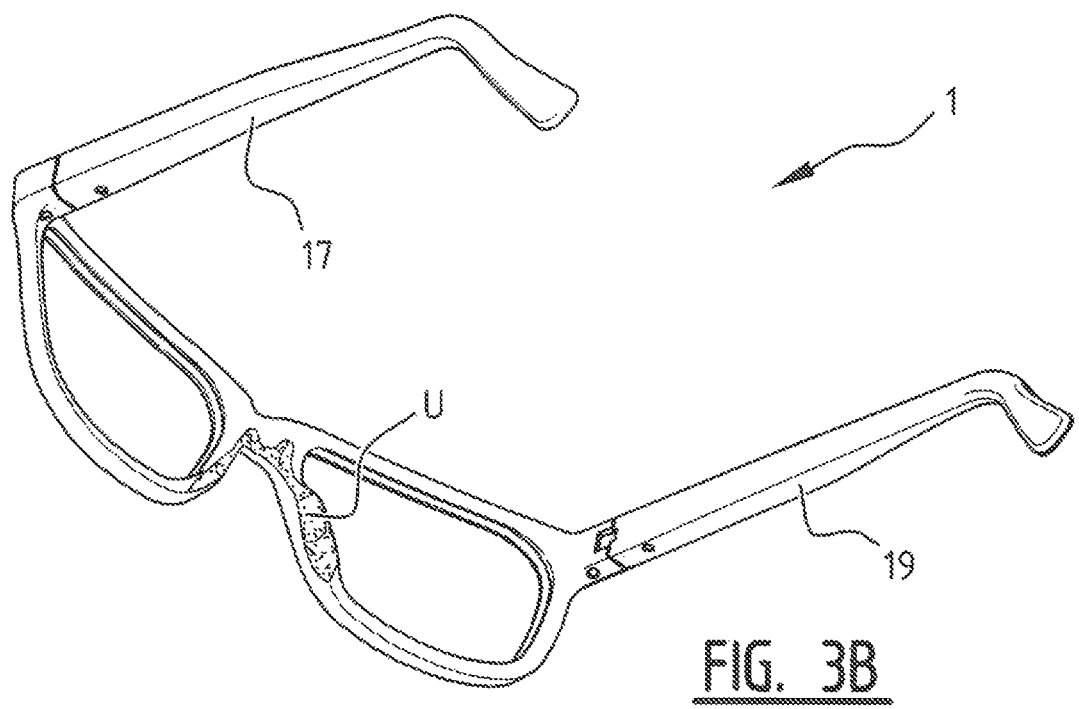
FIG. 3B shows a perspective view of the 3D model of the spectacle frame to be adapted of FIG. 3A after a portion has been cut out.
Figure 4A:
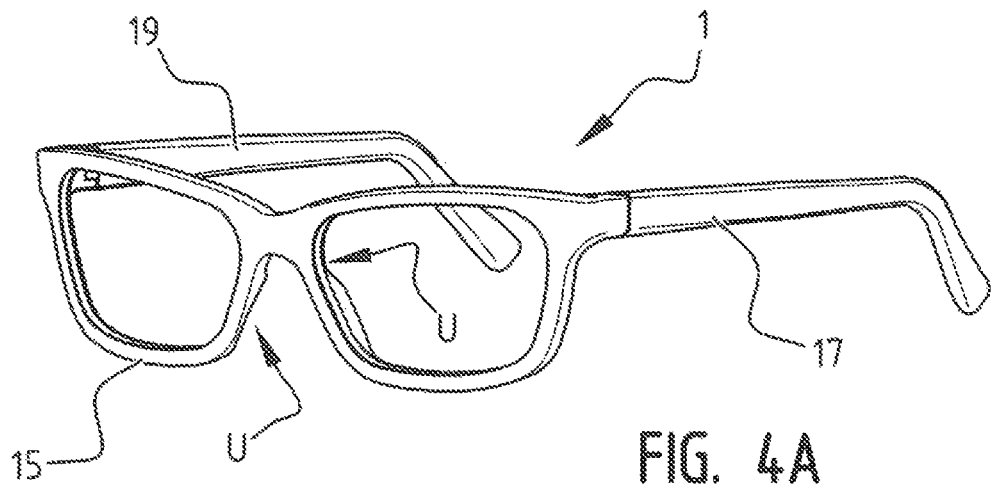
FIG. 4A shows a perspective view of the 3D model of the spectacle frame of FIG. 3B from another viewpoint.
Figure 4B:
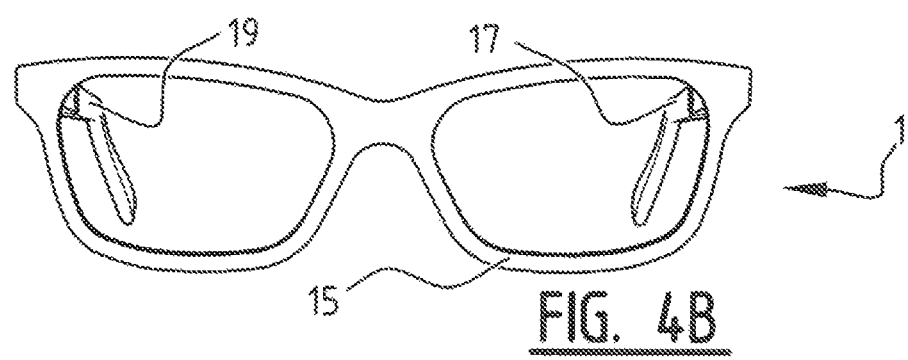
FIG. 4B shows a front view of the 3D model of the spectacle frame of FIG. 4A.

FIG. 3A shows a perspective view of the rear side of the 3D model of spectacle frame 1 and a part of the 3D model of head 3, particularly a part around nose 9 of the 3D model of head 3, of FIG. 2. It is shown that the surface of the nose of the 3D model of head 3 intersects frame front 15 of the 3D model of frame 1. By cutting a portion out of frame front 15 of the 3D model of spectacle frame 1 along the intersecting plane of frame front 15 of the 3D model of frame 1 and nose 9 of the 3D model of head 3, frame front 15 of the 3D model of spectacle frame 1 is adapted to the nose of the spectacle wearer without deforming the shape of the spectacle frame, particularly the forms and lines of the shape and the proportions thereof. When a portion is cut out, the portions X are thus cut off frame front 15 of the 3D model of spectacle frame 1. FIG. 3B shows a perspective view of the rear side of the 3D model of spectacle frame 1 after portion U has been cut out of frame front 15. FIG. 4A shows a perspective view of the front side of the 3D model of frame 1 after portion U has been cut out of frame front 15. FIG. 4B shows a front view of the front side of the 3D model of frame 1 after portion U has been cut out of frame front 15. As shown in FIG. 4B, the cut-out portion cannot be detected in front view. The shape of the frame front 15 of frame 1 adapted to the spectacle wearer has not been altered by the cut-out portion.

Frame front 15 and frame temples 17, 19 of spectacle frame 1 can then be manufactured on the basis of the 3D model of spectacle frame 1 after the portion has been cut out, particularly by means of an additive manufacturing technique, preferably a 3D printing technique. After the thus manufactured frame front 15 and frame temples 17, 19 are connected by means of hinges, a spectacle frame then results which is particularly comfortable to wear on the nose when worn by the spectacle wearer with frame front 15 in the desired position of wear, which was chosen before a portion was cut out in virtual environment 5. Because the cut-out portion is a 3D cut-out portion, the desired position of wear of the frame front on the nose is clearly defined in frame front 15. The spectacle wearer can thus perceive when frame front 15 is being worn in the chosen desired position of wear and is thus stimulated to wear frame front 15 in the chosen desired position of wear.

Figure 5:
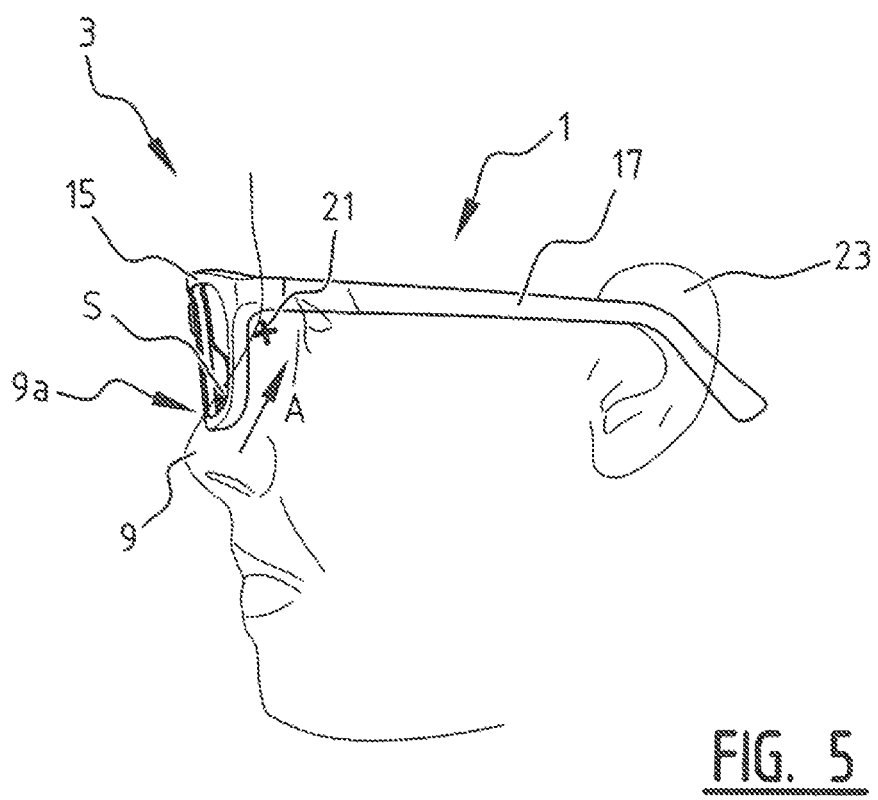
FIGS. 5-7 show the positioning of the frame front of the 3D model of the spectacle frame relative to the 3D model of the head in a schematic side view of the 3D model of the spectacle frame and the 3D model of the head in the virtual environment of FIGS. 1 and 2.
Figure 6:
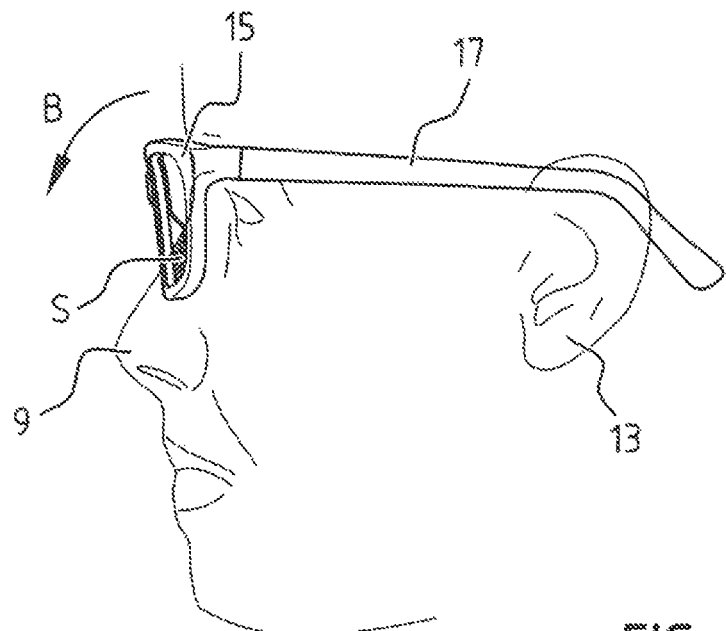
Figure 7:
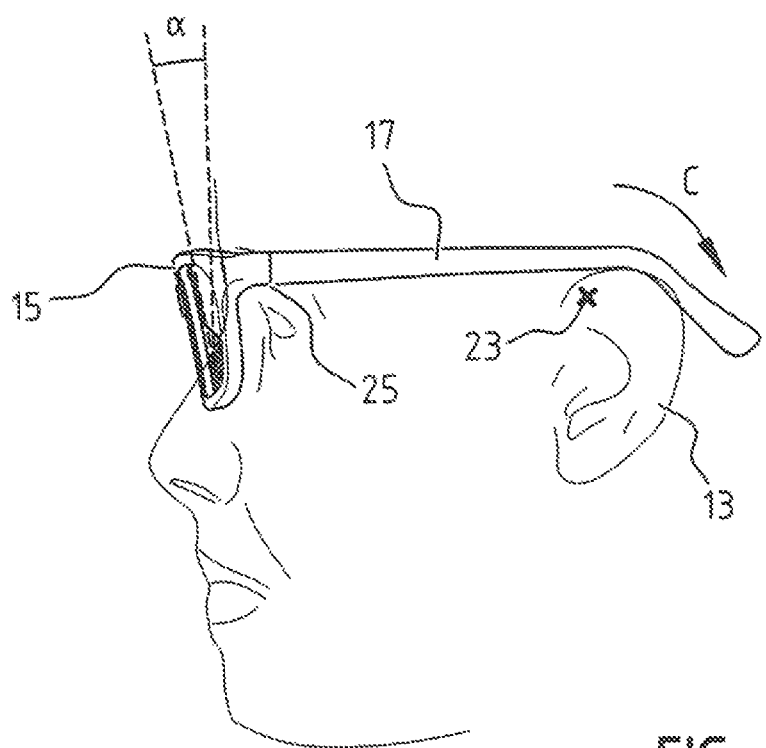

FIGS. 5-7 show the positioning of frame front 15 of the 3D model of spectacle frame 1 relative to the 3D model of head 3 before a portion is cut out in more detail, particularly in a schematic side view of the 3D model of frame 1 and the 3D model of head 3 in virtual environment 5.

It is shown with reference to FIGS. 5 and 6 that during positioning of frame front 15 of the 3D model of spectacle frame 1 relative to the 3D model of head 3, frame front 15 of the 3D model of frame 1 is positioned at the location on nose 9 of the 3D model of head 3 where frame front 15 is in the desired position of wear of frame front 15. FIG. 5 shows that the location on the nose where frame front 15 is in the desired position of wear of frame front 15 is marked on nose 9 of the 3D model of head 3 by means of a marking 21. By displacing frame front 15 of the 3D model of spectacle frame 1 along nasal bone 9a in the direction of arrow A, frame front 15 of the 3D model of frame 1 can be positioned at the location on nose 9 of the 3D model of head 3, as shown in FIG. 6, where frame front 15 is in the desired position of wear of frame front 15. Marking 21 on nose 9 of the 3D model of head 3 here helps to position frame front 15 at the correct location. Hatching S shows schematically where frame front 15 of the 3D model of spectacle frame 1 and nose 9 of the 3D model of head 3 intersect each other.

It is shown with reference to FIGS. 6 and 7 that during positioning of frame front 15 of the 3D model of spectacle frame 1 relative to the 3D model of head 3, frame front 15 of the 3D model of frame 1 call be tilted in the sagittal plane of the head, which runs parallel to the plane of the drawing, in the direction of arrow B in order to set the pantoscopic angle α.

As shown in FIGS. 5-7, if the 3D model of head 3 comprises the face of the spectacle wearer during the positioning of the frame front of the 3D model of the frame relative to the 3D model of head 3, it is possible to verify that the 3D model of head 3 only intersects frame front 15 of the 3D model of frame 1 where frame front 15 is worn on nose 9 in the desired position of wear. If the 3D model of the head also comprises the eyelashes of the spectacle wearer (not shown), it is possible to verify during the positioning of frame front 15 of the 3D model of frame 1 relative to the 3D model of head 3 that the eyelashes of the 3D model of head 3 lie clear of the lenses to be positioned in frame front 15.

FIGS. 5-7 show that the position of frame temples 17, 19 of the 3D model of spectacle frame 1 relative to the 3D model of head 3 changes during the positioning of frame front 15 of the 3D model of spectacle frame 1 relative to the 3D model of head 3 as a result of the mutually associated positions of frame front 15 and frame temples 17, 19 of the 3D model of frame 1. FIG. 7 shows that after the positioning of frame front 15 of the 3D model of spectacle frame 1 relative to the 3D model of head 3 the frame temples 17, 19 are not in contact with the location at the base of ears 13, marked in the 3D model of the head by means of marking 23, which represents the location where the frame temples are in contact with the head when the frame is being worn. The adaptation of frame temples 17, 19 of the 3D model of spectacle frame 1 is shown hereinbelow with reference to FIGS. 7-13. The position of frame front 15 of the 3D model of frame front 1 relative to the 3D model of head 3 is maintained during the adaptation of frame temples 17, 19 of the 3D model of frame 1, so that the chosen position of wear of frame front 15 is not interfered with.

Figure 8:
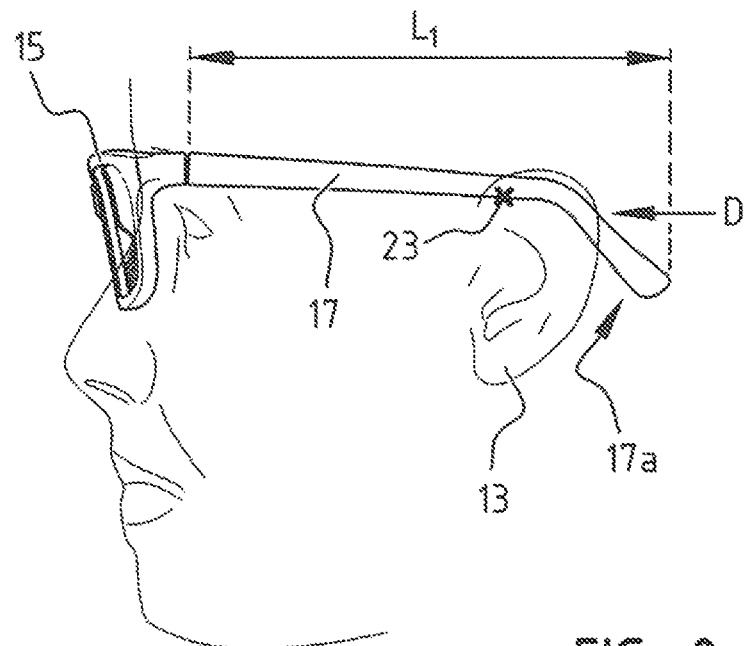
FIGS. 8 and 9 show the adaptation of the frame temples of the 3D model of the spectacle frame in a schematic side view of the 3D model of the spectacle frame and the 3D model of the head in the virtual environment of FIGS. 1 and 2.

It is shown with reference to FIGS. 7 and 8 that the orientation of frame temples 17, 19 of the 3D model of spectacle frame 1 relative to frame front 15 of the 3D model of frame 1 is adapted by rotating frame temples 17, 19 relative to frame front 15 around a defined rotation axis 25 in the direction of arrow B, so that frame temples 17, 19 are in contact with the location at the base of ears 13 of the 3D model of head 3 which represents the location where frame temples 17, 19 are in contact with the head when spectacle frame 1 is being worn.

Figure 9:
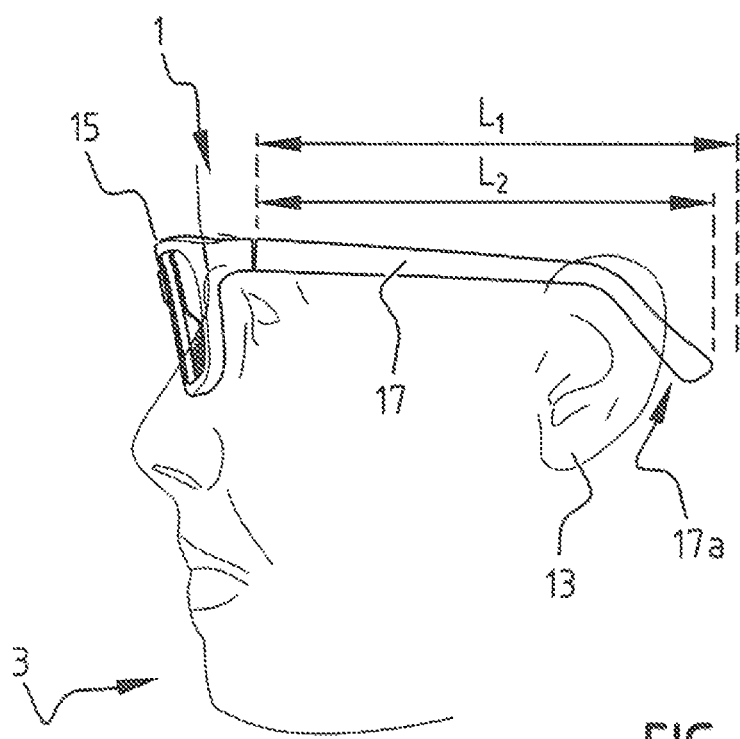

It is shown with reference to FIGS. 8 and 9 that the length $l_1$ of frame temples 17, 19 of the 3D model of spectacle frame 1 is adapted into an adapted length $l_2$, wherein the hook-like ends 17a, 19a of frame temples 17, 19 are displaced in the direction of arrow D so that the hook-like ends 17a, 19a of frame temples 17, 19 connect to the base of ears 13.

Figure 10:
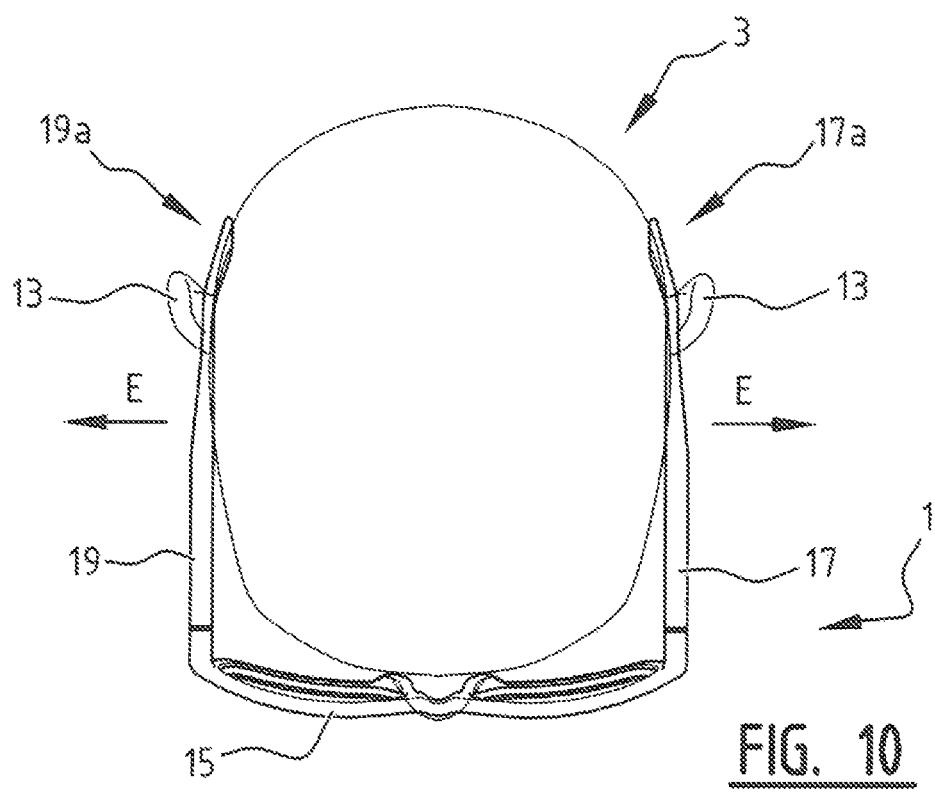
FIGS. 10 and 11 show the adaptation of the frame temples of the 3D model of the spectacle frame in a schematic top view of the 3D model of the spectacle frame and the 3D model of the head in the virtual environment of FIGS. 1 and 2.
Figure 11:
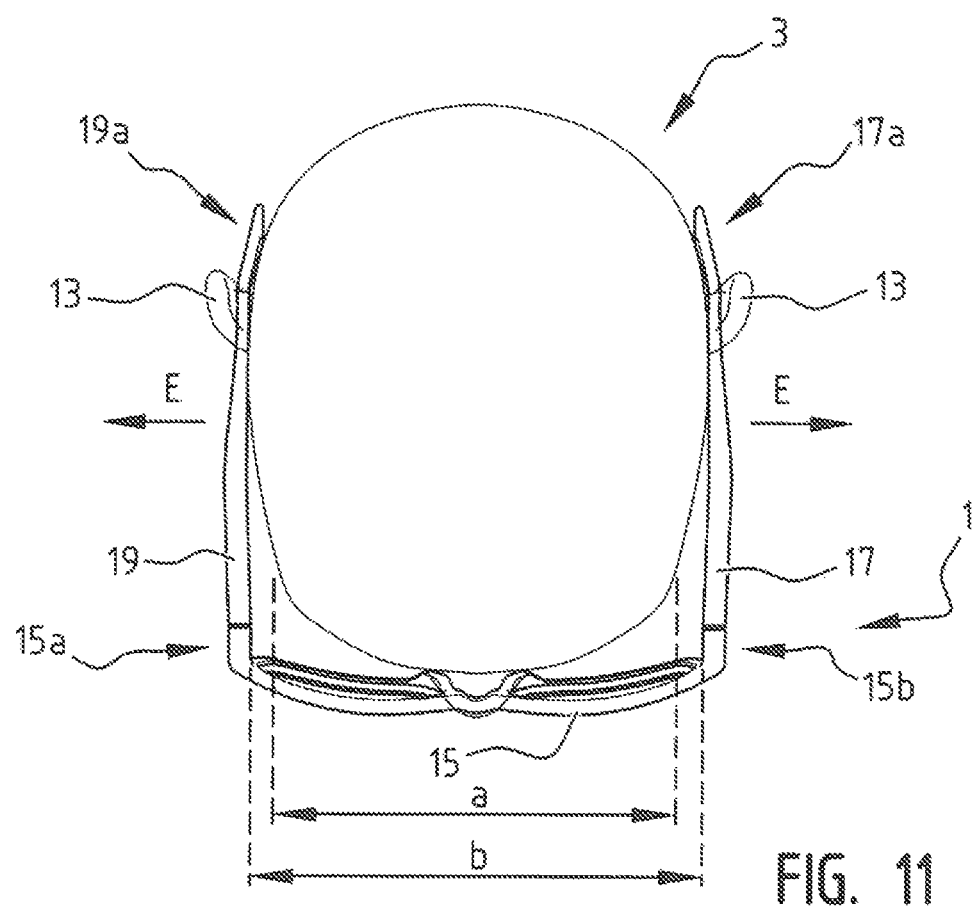

It is shown with reference to FIGS. 10 and 11, particularly in a schematic top view of the 3D model of spectacle frame 1 and the 3D model of head 3 in virtual environment 5, that the curvature of frame temples 17, 19 of the 3D model of frame 1 is adapted in an anatomical transverse plane of the head, which runs parallel to the plane of the drawing. This is realized particularly by displacing parts of the frame temples 17, 19 of the 3D model of frame 1 away from the 3D model of head 3 in the direction of arrows E, depending on the curvature of the part of head 3 along which frame temples 17, 19 run.

It is noted with reference to FIGS. 10 and 11 that the width b of the 3D model of spectacle frame 1 is adjusted to the width of the head, particularly the distance a between the temples of the head. Since it is difficult to widen frame front 15 of the 3D model of spectacle frame 1 without changing the shape of frame front 15, i.e. deforming the forms and lines thereof, the 3D model of frame 1 is chosen from a collection of 3D models of frames 1 with different widths b, wherein the shape of the respective frames 1 of different widths b is carefully chosen by the designer so that the spectacle frames of different widths b correspond in respect of the shape thereof. Instead of adapting the length and/or curvature of the frame temples of the 3D model of the frame as described above, it is alternatively possible to choose the 3D model of frame 1 from a collection of 3D models of frames 1 with frame temples 17, 19 with different lengths and/or curvature. It is alternatively also possible to compose the 3D model of spectacle frame 1 from a 3D model of a frame front 15 chosen from a collection of 3D models of frame fronts 15 with different widths b and a 3D model of frame temples 17, 19 chosen from a collection of 3D models of frame temples 17, 19 with different lengths and/or curvature. It is thus possible to avoid adaptation of the length and/or curvature of frame temples 17, 19 and possible deformation of the shape of frame temples 17, 19 associated therewith. This latter can be important in the case of frame temples 17, 19 which have a particularly distinctive shape.

Figure 12:
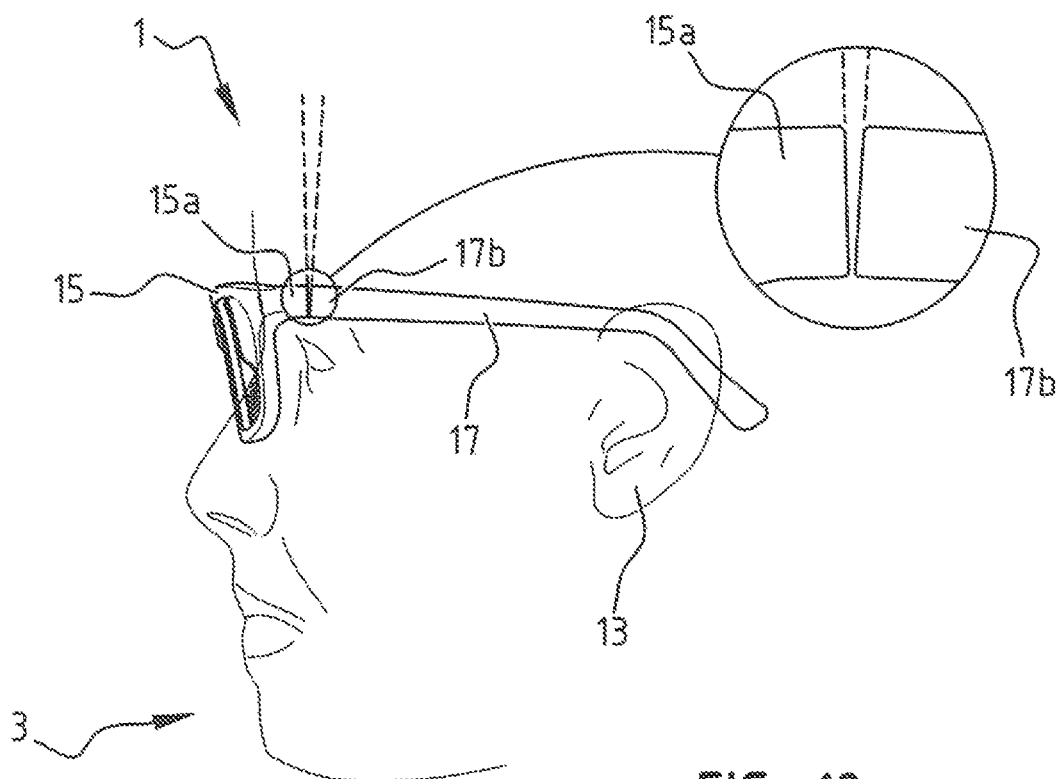
FIGS. 12 and 13 show the mutual adaptation of the frame front and the frame temples of the 3D model of the spectacle frame in a schematic side view of the 3D model of the spectacle frame and the 3D model of the head in the virtual environment of FIGS. 1 and 2.
Figure 13:
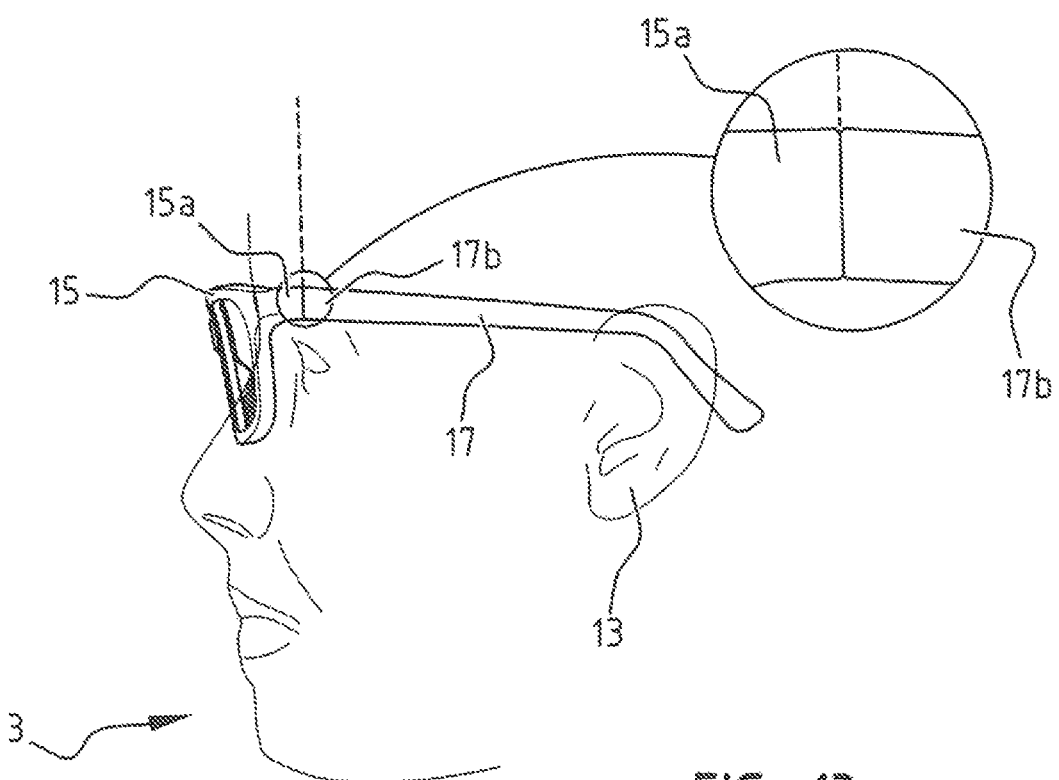

As shown in FIG. 12, frame temples 17, 19 and frame front 15 no longer connect to each other as they do in the starting situation shown in FIG. 7 as a result of the adaptation of frame temples 17, 19 of the 3D model of spectacle frame 1, particularly as a result of the adaptation of the orientation of frame temples 17, 19 of the 3D model of frame 1 relative to frame front 15 of the 3D model of frame 1. It is noted with reference to FIGS. 12 and 13 that mutually opposite parts of frame front 15a, 15b and frame temples 17b, 19b of the 3D model of the frame are adapted to each other by adapting the end 17b, 19b of frame temples 17, 19 lying against frame front 15.

Figure 14:
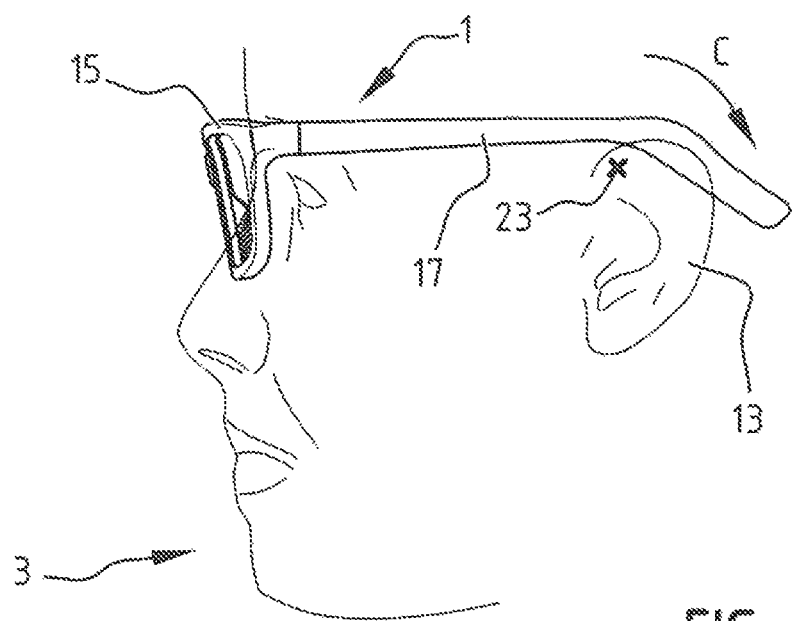
FIGS. 14 and 15 show the adaptation of the frame temples of the 3D model of the spectacle frame by means of cutting out of a portion in a schematic side view of the 3D model of the spectacle frame and the 3D model of the head in the virtual environment of FIGS. 1 and 2.
Figure 15:
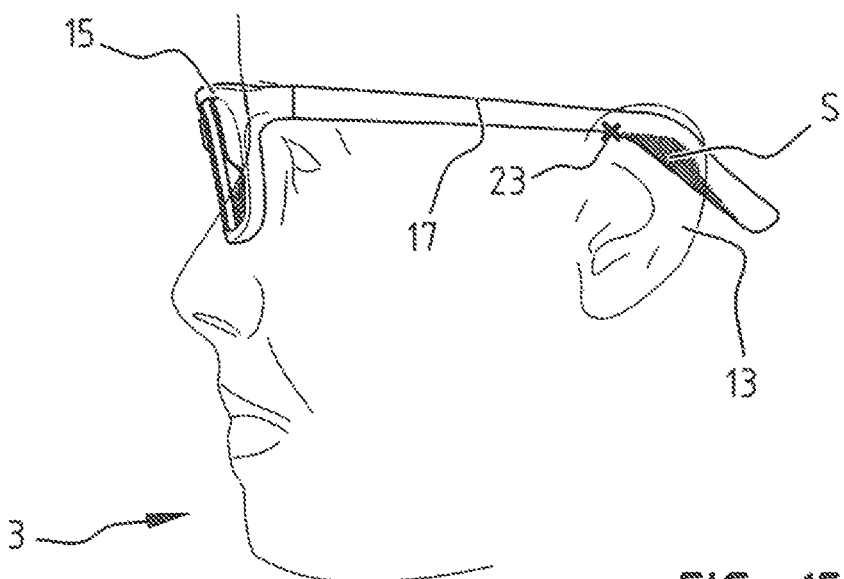

It is shown with reference to FIGS. 14 and 15 that it is also possible according to the invention to cut a portion out of frame temples 17, 19 of the 3D model of spectacle frame 1 in order to adapt frame temples 17, 19 of the 3D model of frame 1 to the part of the head with which frame temples 17, 19 are in contact when the frame is being worn. It is shown with reference to FIGS. 14 and 15 that, similarly to the situation as shown in FIGS. 7 and 8, the orientation of frame temples 17, 19 of the 3D model of frame 1 relative to frame front 15 of the 3D model of frame 1 is adapted by rotating frame temples 17, 19 relative to frame front 15 around a defined rotation axis 25 into a desired position of wear of frame temples 17, 19, in the direction of arrow C. As shown in FIG. 15, frame temples 17, 19 of the 3D model of spectacle frame 1 are here positioned relative to the 3D model of head 3 such that frame temples 17, 19 of the 3D model of frame 1 intersect the 3D model of head 3 where frame temples 17, 19 of frame 1 will be in contact with the head of the spectacle wearer in the desired position of wear thereof. By cutting a portion out of frame temples 17, 19 of the 3D model of frame 1 along the intersecting plane of frame temples 17, 19 of the 3D model of frame 1 and the 3D model of head 3, a 3D model results of an adapted frame 1 with frame temples 17, 19 which are adapted to the spectacle wearer. As shown, the locations where frame temples 17, 19 of the 3D model of frame 1 and the 3D model of head 3 intersect each other are visually marked in virtual environment 5 by means of hatching S.

Figure 16:
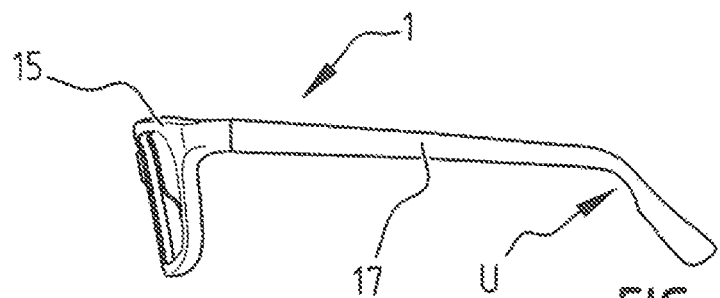
FIG. 16 shows a schematic side view of the 3D model of the spectacle frame of FIGS. 13 and 14 after a portion has been cut out of the frame temples.

FIG. 16 shows the adapted 3D model of spectacle frame 1 with frame temples 17, 19, from which a portion U has been cut out. Frame front 15 and frame temples 17, 19 of frame 1 can then be manufactured on the basis of the 3D model of the frame after the portion has been cut out, particularly by means of an additive manufacturing technique, preferably a 3D printing technique. After the thus manufactured frame front 15 and frame temples 17, 19 are connected by means of hinges, a spectacle frame 1 then results which is particularly comfortable to wear on the ears when it is being worn by the wearer with the frame temples in the desired position of wear, which is chosen before a portion is cut out in the virtual environment. If a portion is also cut out of frame front 15 of frame 1 as described above, a spectacle frame results which is both particularly comfortable to wear on the nose and comfortable on the ears.

Figure 17:
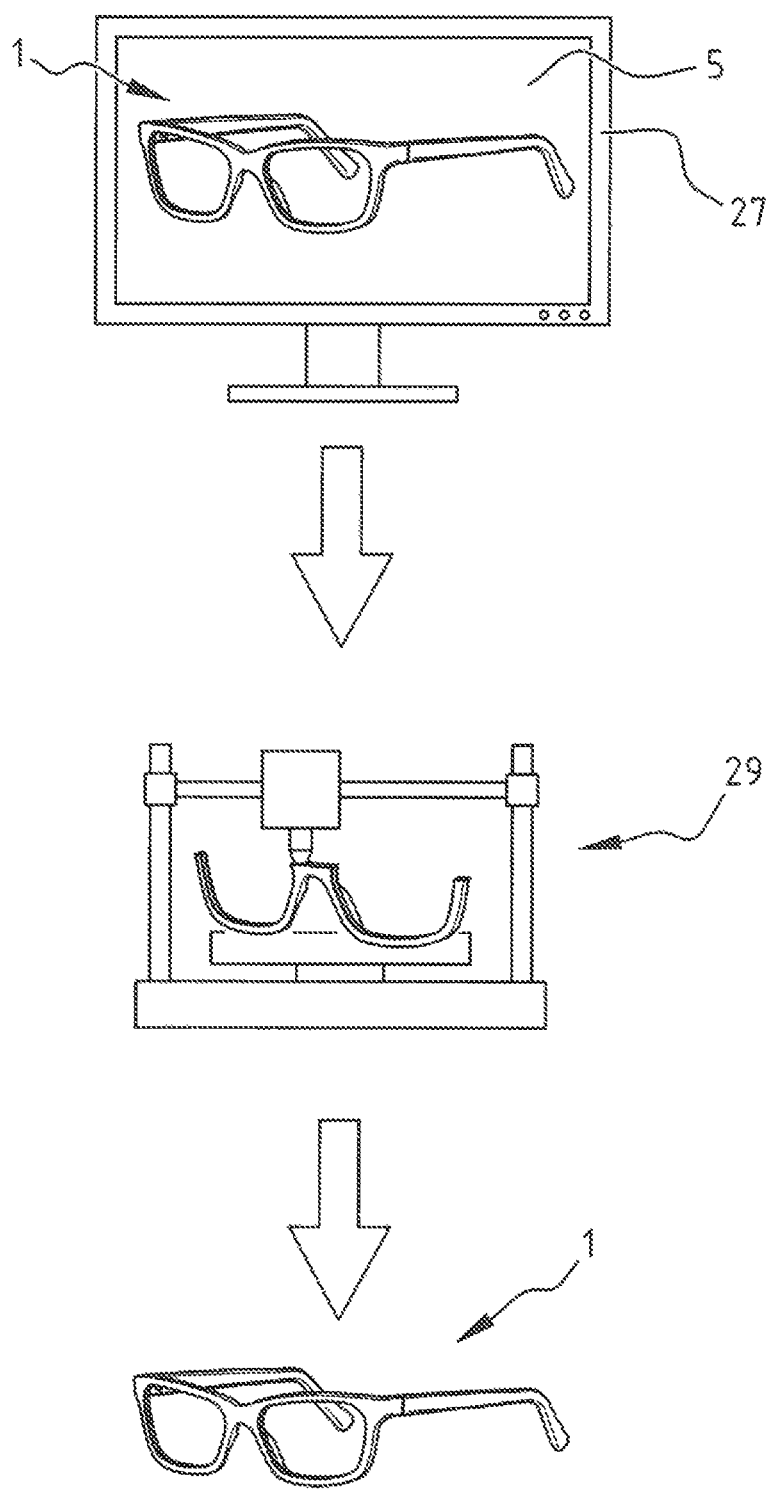
FIG. 17 shows schematically the manufacture according to the method of the invention of an adapted 3D model of a spectacle frame.

FIG. 17 shows a monitor 27 of the computer system which generates the virtual environment, wherein monitor 27 visually displays virtual environment 5 with therein the 3D model of spectacle frame 1 after adaptation thereof. FIG. 17 shows schematically by means of an arrow from monitor 27 to a 3D printer 29 that instructions are given from the computer system to 3D printer 29 to manufacture a frame on the basis of the adapted 3D model of frame 1 by means of a 3D printing technique. In FIG. 17 a part of the frame front of the frame to be manufactured is already shown on 3D printer 29. FIG. 17 shows schematically by means of an arrow from 3D printer 29 to the manufactured frame 1 that a physical model of frame 1 which corresponds to the adapted 3D model of frame 1 results after the manufacture of frame front 15 and frame temples 17, 19 of frame 1 and the connecting of the thus manufactured frame front 15 and frame temples 17, 19 by means of hinges.

Figure 18:
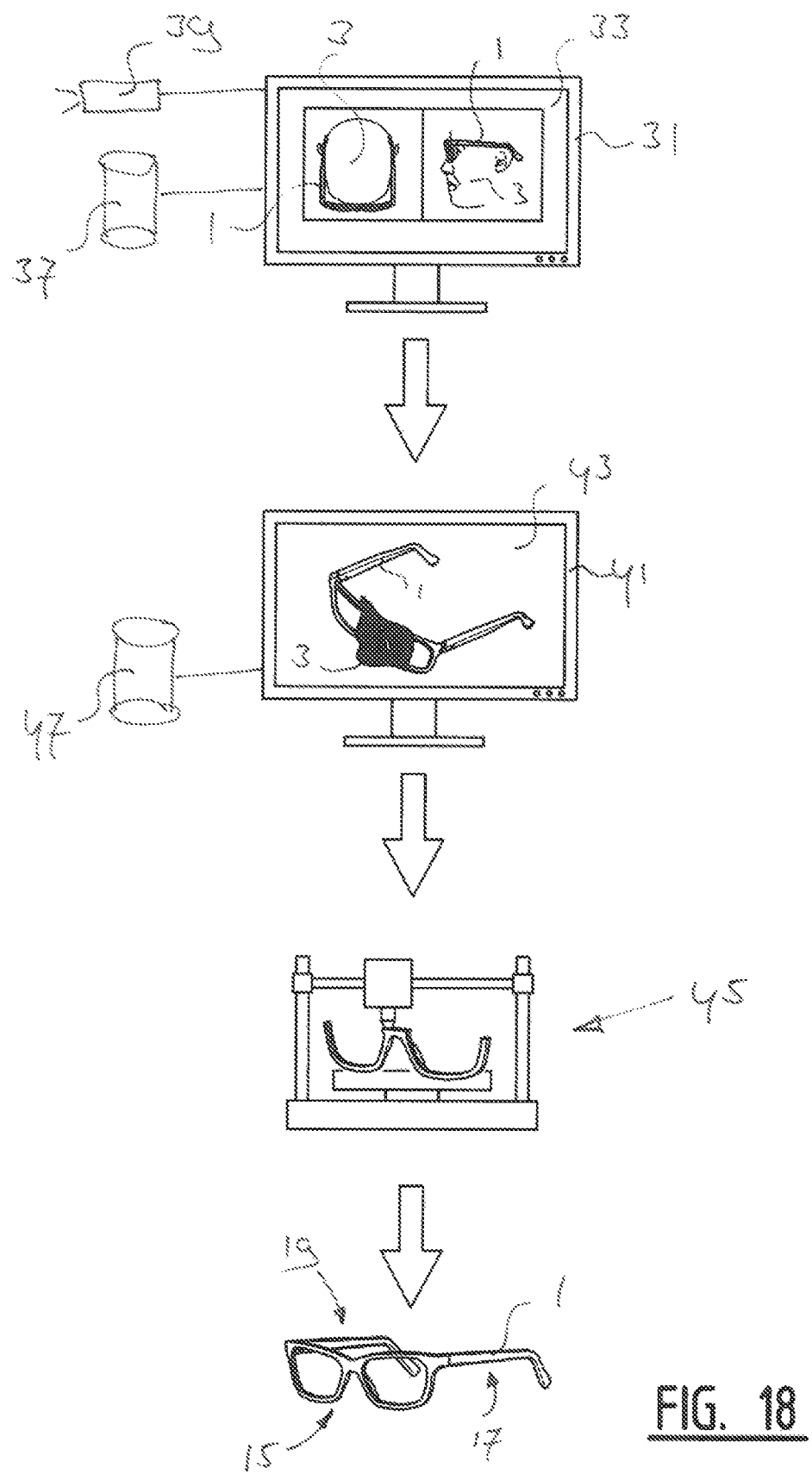
FIG. 18 shows schematically the manufacture according to a favourable embodiment of the method of the invention of an adapted 3D model of a spectacle frame.

FIG. 18 shows a first monitor 31 of a first computer system which generates a first virtual environment, wherein monitor 31 displays a first virtual environment 33 with therein a version of the 3D model of spectacle frame 1 and the 3D model of head 3 for the purpose of positioning the 3D model of frame 1 relative to the 3D model of the head in the desired position of wear as described above with reference to FIGS. 5-11. As shown schematically, the first computer system has access to a collection 37 of 3D models of spectacle frames 1 with different widths b of frame 1, from which a 3D model to be adapted is chosen as noted above in respect of FIGS. 10 and 11. It is also shown schematically that the first computer system has at its disposal a camera system or 3D scanner system 39 for the purpose of generating the 3D model of hedge 3.

Shown schematically in FIG. 18 by means of an arrow from monitor 31 to a second monitor 41 is that the 3D model of head 3 and data relating to the desired position of wear are transferred from the first computer system to a second virtual environment 43 which is generated by a second computer system. As shown schematically in second monitor 41, a version of the 3D model of spectacle frame 1 is adapted as described above with reference to FIGS. 3A, 3B and FIGS. 12-16 in the second virtual environment 43 on the basis of the transferred 3D model of head 3 and of the transferred data relating to the desired position of wear. Shown schematically in FIG. 18 by means of an arrow from second monitor 41 to a 3D printer 45 is that instructions are given from the second computer system to 3D printer 45 to manufacture a spectacle frame on the basis of the adapted 3D model of frame 1 by means of a 3D printing technique. In FIG. 18 a part of the frame front of the frame to be manufactured is already shown on 3D printer 45. FIG. 18 shows schematically by means of an arrow from 3D printer 45 to the manufactured frame 1 that a physical model of frame 1 which corresponds to the adapted 3D model of frame 1 results after the manufacture of frame front 15 and frame temples 17, 19 of frame 1 and the connecting of the thus manufactured frame front 15 and frame temples 17, 19 by means of hinges.

It is noted in respect of FIG. 18 that it is possible that two different versions of the 3D model of spectacle frame 1 to be adapted are used in first virtual environment 33 and in second virtual environment 43: i.e. a version optimized for positioning of the 3D model of the spectacle frame relative to the 3D model of the head in the first virtual environment and a version optimized for cutting a portion from and manufacturing the 3D model of the frame in the second virtual environment. In this case it is not necessary to transfer the chosen 3D model of frame 1 to the second computer system after positioning thereof in the first virtual environment 33 of first computer system 31. As shown in FIG. 18, the second computer system has access to a collection 47 of 3D models of spectacle frame 1, from which a version of the 3D model of frame 1 to be adapted, which corresponds to the version of the 3D model of frame 1 which was chosen in the first virtual environment 33, is chosen in the second virtual environment 43. It is alternatively possible that the same 3D model of frame 1 is used during positioning and during adaptation and manufacture. In that case it is possible that, in addition to the 3D model of the head and the data relating to the desired position of wear, the chosen 3D model of frame 1 is also transferred from the first computer system to the second computer system.

The present invention is not limited to the above described exemplary embodiments. The rights sought are defined by the following claims, within the scope of which many adaptations can be envisaged.

The invention claimed is:

1. Method for manufacturing a spectacle frame adapted to a spectacle wearer, wherein the spectacle frame comprises a frame front and frame temples, and the method comprises the steps of:
   providing a 3D model of the spectacle frame to be manufactured which comprises at least a plurality of forms and lines of the frame front of the spectacle frame;
   providing a 3D model of the head of the spectacle wearer, which comprises at least a part of the head of the spectacle wearer which is in contact with the frame front when the spectacle frame is being worn;
   adapting the 3D model of the spectacle frame to the 3D model of the head of the spectacle wearer;
   preventing the forms and lines of the frame front from being deformed while the 3D model of the spectacle frame is being adapted to the 3D model of the head of the spectacle wearer; and
   manufacturing the frame front of the spectacle frame based on the 3D model of the spectacle frame after being adapted to the 3D model of the head of the spectacle wearer,
   wherein providing the 3D model of the spectacle frame to be manufactured comprises:
      providing a plurality of 3D models of the spectacle frame to be manufactured, each of the plurality of 3D models of the spectacle frame comprising a different width, at least the frame front of the spectacle frame, and at least one part of the spectacle frame which is to be in contact with the 3D model of the head of the spectacle wearer that is over dimensioned; and
      selecting a 3D model of the spectacle frame from the plurality of 3D models of the spectacle frame to correspond to a width of the head of the spectacle wearer,
   wherein adapting the 3D model of the spectacle frame to the 3D model of the head of the spectacle wearer comprises:
      positioning the frame front of the selected 3D model of the spectacle frame in a desired position of wear relative to the 3D model of the head of the spectacle wearer in a virtual environment so that the 3D model of the head of the spectacle wearer intersects a rear side of the frame front of the selected 3D model of the spectacle frame; and
      cutting a portion out of the rear side of the frame front of the selected 3D model of the spectacle frame along an intersecting plane of the frame front of the selected 3D model of the spectacle frame and the 3D model of the head of the spectacle wearer in order to adapt the frame front of the spectacle frame to be manufactured to the spectacle wearer, wherein the portion cut out of the rear side of the frame front of the selected 3D model of the spectacle frame corresponds to a portion of the frame front which makes contact with a nose of the spectacle wearer, and
   wherein manufacturing the frame front of the spectacle frame based on the 3D model of the spectacle frame after being adapted to the 3D model of the head of the spectacle wearer comprises:
maintaining an unadapted front side of the frame front; and
forming the rear side of the frame front according to the portion removed of the rear side of the frame front of the selected 3D model of the spectacle frame.

2. Method as claimed in claim 1, wherein the positioning of the frame front of the selected 3D model of the spectacle frame relative to the 3D model of the head of the spectacle wearer comprises positioning the frame front of the 3D model of the spectacle frame at a location on the nose of the 3D model of the head of the spectacle wearer defining the desired position of wear of the frame front.

3. Method as claimed in claim 2, further comprising, before positioning of the frame front of the 3D model of the spectacle frame relative to the 3D model of the head of the spectacle wearer, marking in the 3D model of the head of the spectacle wearer the location on the nose defining the desired position of wear of the frame front.

4. Method as claimed in claim 3, wherein marking in the 3D model of the head of the spectacle wearer the location on the nose defining the desired position of wear of the frame front comprises marking on the nose of the spectacle wearer a location which represents the location of the desired position of wear, before a 3D model of the head of the spectacle wearer is provided, wherein the 3D model of the head of the spectacle wearer is provided on the basis of the nose of the spectacle wearer with the location marked thereon.

5. Method as claimed in claim 3, wherein the positioning of the frame front of the 3D model of the spectacle frame at the location on the nose of the 3D model of the head of the spectacle wearer defining the desired position of wear of the frame front is performed depending on the marked location in the 3D model of the head of the spectacle wearer.

6. Method as claimed in claim 1, wherein the positioning of the frame front of the selected 3D model of the spectacle frame relative to the 3D model of the head of the spectacle wearer comprises tilting the frame front of the 3D model of the spectacle frame in the sagittal plane of the head.

7. Method as claimed in claim 1,
wherein the 3D model of the spectacle frame comprises the frame temples of the spectacle frame to be adapted, wherein the position of the frame temples of the 3D model of the spectacle frame is associated with the frame front of the 3D model of the spectacle frame, and
wherein the 3D model of the head of the spectacle wearer comprises at least a representation of the location on the head where the frame temples are in contact with the head of the spectacle wearer when the spectacle frame is being worn.

8. Method as claimed in claim 7, wherein the frame temples are manufactured on the basis of the frame temples of the 3D model of the spectacle frame.

9. Method as claimed in claim 8, wherein the method further comprises adapting the frame temples of the 3D model of the spectacle frame in the virtual environment.

10. Method as claimed in claim 9, wherein the frame temples of the 3D model of the spectacle frame are adapted to the position of the frame front of the 3D model of the spectacle frame relative to the 3D model of the head of the spectacle wearer during or after the positioning of the frame front of the 3D model of the spectacle frame relative to the 3D model of the head of the spectacle wearer.

11. Method as claimed in claim 9, wherein the position of the frame front of the 3D model of the spectacle frame relative to the 3D model of the head of the spectacle wearer is maintained during adaptation of the frame temples of the 3D model of the spectacle frame.

12. Method as claimed in claim 9, wherein the frame temples of the 3D model of the spectacle frame are adapted depending on at least one of:
the constraints, defined between the frame front of the 3D model of the spectacle frame and the frame temples of the 3D model of the spectacle frame, in respect of the position of the frame front relative to the frame temples;
the curvature of a part of the 3D model of the head of the spectacle wearer along which the frame temples of the 3D model of the spectacle frame run; and
the location in the 3D model of the head of the spectacle wearer which represents the location on the ears of the spectacle wearer where the frame temples rest on the ears when the spectacle frame is being worn.

13. Method as claimed in claim 9, wherein the adaptation of the frame temples of the 3D model of the spectacle frame comprises adapting the length of the frame temples.

14. Method as claimed in claim 9, wherein the adaptation of the frame temples of the 3D model of the spectacle frame comprises adapting the curvature of the frame temples of the 3D model of the spectacle frame in an anatomical transverse plane of the head of the spectacle wearer.

15. Method as claimed in claim 9, wherein the adaptation of the frame temples of the 3D model of the spectacle frame comprises adapting the orientation of the frame temples of the 3D model of the spectacle frame relative to the frame front of the 3D model of the spectacle frame.

16. Method as claimed in claim 9, wherein during or after adaptation of the frame temples of the 3D model of the spectacle frame, mutually opposite parts of the frame front and the relevant frame temple of the 3D model of the spectacle frame are adapted to each other, this for each frame temple, by adapting at least one of the two parts.

17. Method as claimed in claim 1,
wherein the virtual 3D model of the head of the spectacle wearer comprises at least the face of the spectacle wearer, and
wherein during the positioning of the frame front of the 3D model of the spectacle frame relative to the 3D model of the head of the spectacle wearer, the frame front of the 3D model of the spectacle frame is positioned relative to the 3D model of the head such that the 3D model of the head only intersects the frame front of the 3D model of the spectacle frame where the frame front is worn on the nose in the desired position of wear.

18. Method as claimed in claim 1,
wherein the 3D model of the head of the spectacle wearer comprises at least the eyelashes of the spectacle wearer,
wherein the 3D model of the spectacle frame comprises at least a representation of the location of the lenses in the frame front, and
wherein during positioning of the 3D model of the frame front relative to the 3D model of the head of the spectacle wearer, the 3D model of the frame front is positioned relative to the 3D model of the head of the spectacle wearer such that the eyelashes of the 3D model of the head lie clear of the lenses to be positioned in the frame front.

19. Method as claimed in claim 1,
wherein the 3D model of the spectacle frame comprises the frame temples,
wherein the 3D model of the head of the spectacle wearer comprises at least the part of the head of the spectacle wearer with which the frame temples are in contact in a desired position of wear thereof, wherein the frame temples of the 3D model of the spectacle frame are positioned relative to the 3D model of the head of the spectacle wearer in the virtual environment so that the 3D model of the head of the spectacle wearer intersects the frame temples of the 3D model of the spectacle frame where the frame temples of the spectacle frame are in contact with the head of the spectacle wearer in the desired position of wear thereof, wherein a portion is cut out of the frame temples of the 3D model of the spectacle frame along the intersecting plane of the frame temples of the 3D model of the spectacle frame and the 3D model of the head of the spectacle wearer, and wherein the frame temples are manufactured on the basis of the frame temples of the 3D model of the spectacle frame from which the portion has been cut.

20. Method as claimed in claim 1, wherein the virtual environment in which the 3D model of the spectacle frame is positioned relative to the 3D model of the head of the spectacle wearer is a visual virtual environment.

21. Method as claimed in claim 20, wherein the locations where the 3D model of the spectacle frame and the 3D model of the head of the spectacle wearer intersect each other are visually marked in the virtual environment during the positioning of the 3D model of the spectacle frame relative to the 3D model of the head of the spectacle wearer in the virtual environment.

22. Method as claimed in claim 1, wherein the positioning of the frame front of the chosen 3D model of the spectacle frame in a desired position of wear relative to the 3D model of the head of the spectacle wearer is performed in a first virtual environment, wherein data relating to the desired position of wear are transferred to a second virtual environment after the positioning, wherein cutting a portion out of the rear side of the frame front of the chosen 3D model of the spectacle frame is performed in the second virtual environment.

23. Method as claimed in claim 1, wherein the manufacturing on the basis of a 3D model comprises of manufacturing the 3D model by means of an additive manufacturing technique, preferably a 3D printing technique.

24. Method as claimed in claim 1, wherein providing the 3D model of the head of the spectacle wearer comprises of scanning at least a part of the head of the spectacle wearer by means of a 3D scanning process or generating the 3D model on the basis of a series of 2D photos of at least a part of the head of the spectacle wearer.

* * * * *